(12) United States Patent
Acharya et al.

(10) Patent No.: US 8,369,219 B2
(45) Date of Patent: Feb. 5, 2013

(54) SYSTEM AND METHOD FOR MANAGING BANDWIDTH

(75) Inventors: Dipankar Bhatt Acharya, Saratoga, CA (US); Hugh Holbrook, San Francisco, CA (US); Fusun Ertemalp, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1204 days.

(21) Appl. No.: 11/523,335

(22) Filed: Sep. 19, 2006

(65) Prior Publication Data

US 2008/0069138 A1 Mar. 20, 2008

(51) Int. Cl.
*H04L 12/26* (2006.01)

(52) U.S. Cl. .................. 370/235; 370/415; 370/429

(58) Field of Classification Search .................. 370/235, 370/412, 429
See application file for complete search history.

(56) References Cited

U.S. PATENT DOCUMENTS

| | | | | |
|---|---|---|---|---|
| 5,949,778 A * | 9/1999 | Abu-Amara et al. | ......... | 370/388 |
| 6,104,700 A * | 8/2000 | Haddock et al. | ............. | 370/235 |
| 6,757,292 B2 * | 6/2004 | Pate et al. | ...................... | 370/412 |
| 6,810,211 B1 * | 10/2004 | Castanon | ......................... | 398/47 |
| 2003/0191857 A1 * | 10/2003 | Terrell et al. | .................. | 709/244 |
| 2004/0017781 A1 * | 1/2004 | Alferness et al. | ............. | 370/252 |
| 2005/0129019 A1 * | 6/2005 | Cheriton | ........................ | 370/392 |
| 2006/0007855 A1 | 1/2006 | Tran et al. | | |
| 2006/0179156 A1 * | 8/2006 | Eatherton et al. | ............. | 709/238 |

FOREIGN PATENT DOCUMENTS

EP 1555780 7/2005

* cited by examiner

*Primary Examiner* — Hoon J Chung
(74) *Attorney, Agent, or Firm* — Fish & Richardson P.C.

(57) ABSTRACT

A system for managing bandwidth use in a device. In a specific embodiment, the device is a network device that includes a first data scheduler that is adapted to initially share available device bandwidth among a first type of traffic and a second type of traffic on an as-needed basis. A traffic monitor communicates with the first scheduler and causes the first data scheduler to guarantee predetermined transmission characteristics for the second type of traffic. The first data scheduler includes one or more routines for prioritizing first type of traffic above the second type of traffic when the network device is in a first operational mode, and prioritizing the second type of traffic above the first type of traffic when the network device is in a second operation al mode. The minimum transmission characteristics include a minimum service rate and a minimum latency for the second type of traffic.

24 Claims, 4 Drawing Sheets

SYSTEM AND METHOD FOR MANAGING BANDWIDTH

BACKGROUND OF THE INVENTION

This invention is related in general to networks and more specifically relates to systems and methods for managing or controlling bandwidth allotment in a network device, such as a switch or router.

Network devices, such as switches and routers, are employed in various demanding applications, including the Internet and Virtual Private Networks (VPNs). Such applications often demand efficient devices that optimize resource usage, such as bandwidth usage.

Systems for efficiently using device resources are particularly important in network tunneling applications, where additional bandwidth requirements complicate resource management. For the purposes of the present discussion, tunneling may be any transmission of private data through a public network.

Private networks, such as Virtual Private Networks (VPNs), employ tunneling methods to send private data over a public network. Tunneling methods may involve encapsulating private data so that routers in a public network are unaware that the data is associated with a private network. Private data is insulated and associated with private protocol information within packets employed by the public network so that the private protocol information appears to the public network as data.

Various tunneling protocols, such as Point-to-Point Tunneling Protocol (PPTP) or Generic Route Encapsulation (GRE), may facilitate securely encapsulating private data to facilitate transmission over a public network. Tunneling protocols are often employed to send data in Internet-based VPNs. For the purposes of the present discussion, a VPN may be a private network that employs a public network, such as the Internet, to connect remote sites or users.

To encapsulate a packet, tunneling protocols may add an outer tunnel header. Network routers and/or switches examine the header to determine how to route the header through a network. Conventionally, a router or switch examines the outer header of a packet to determine how to route or switch the packet. Routers and switches may also modify packet headers. Examples of common header modifications include stripping, adding, replacing, rewriting, and swapping outer tunnel headers.

Packets that need to be switched or routed after modification of a header are often recirculated passed through the switch or router again in a process called recirculation. Packets that are passed through a switch plural times are called recirculated packets. Other data or packets, such as data or packets exchanged with devices outside of the switch, are called external-link data or packets.

For the purposes of the present discussion, the term traffic may represent the flow of packets or the packets themselves. Hence, the flow of recirculated packets may be called recirculation traffic, and the flow of external-link packets may be called external-link traffic. Furthermore, the terms traffic and packets may be employed interchangeably herein. Bandwidth used to accommodate recirculation traffic at a certain recirculation rate is called recirculation bandwidth or internal bandwidth. Bandwidth used to accommodate external-link traffic, i.e., the flow of external-link packets, at a given external-link rate is called external-link bandwidth or external bandwidth. Used switch bandwidth is the sum of the external link bandwidth and the recirculation bandwidth.

In certain situations, packet recirculations consume switch bandwidth that is required for other operations, such as forming external links via external switch ports. The switch or router is said to be oversubscribed when the switch or router lacks sufficient bandwidth to accommodate all bandwidth demands including recirculated bandwidth and external-link bandwidth demands.

In certain applications, some recirculation ports in an oversubscribed switch are treated like external ports, i.e., recirculation bandwidth and external-link bandwidth is pooled or equally prioritized, so that any excess bandwidth previously reserved for recirculation may be readily employed to accommodate external connections. Unfortunately, in these applications, large memory buffers are required to accommodate bursts of traffic for both the external links and recirculation ports.

Alternatively, recirculation traffic is serviced at lower priority than external-link traffic so that allotted recirculation bandwidth decreases as external-link traffic demands increase. Unfortunately, in cases of sustained oversubscription, the recirculation traffic is dropped after the full switch bandwidth is consumed. If the external link bandwidth consumes all of the switch bandwidth, internal recirculation bandwidth throughput, and consequently tunnel-traffic throughput, ceases.

DETAILED DESCRIPTION OF EMBODIMENTS OF THE INVENTION

A preferred embodiment of the present invention implements a system and method for scheduling traffic in a network device, such as a switch. The method includes allotting a minimum bandwidth for recirculation traffic when recirculation traffic is present and/or when recirculation traffic backs up or is delayed by a predetermined period. Otherwise, external-link traffic is serviced at a higher priority than recirculation traffic, such that available device bandwidth is allotted to external-link traffic before it is allotted to recirculation traffic. Hence, surplus bandwidth representing switch bandwidth that is not used for external-link traffic is used as needed by recirculation traffic, while a certain minimum rate and/or maximum latency or delay for recirculation traffic is guaranteed.

An accompanying system acts as a scheduling mechanism that allows reserving a minimum recirculation bandwidth and bounding recirculation latency while still allowing external-link traffic to be serviced at higher priority than internal recirculation traffic unless sustained congestion exists.

For clarity, various well-known components, such as power supplies, amplifiers, packet-to-cell converters, cell-topacket converters, and so on, have been omitted from the figures. However, those skilled in the art with access to the present teachings will know which components to implement and how to implement them to meet the needs of a given application.

Figure 1:
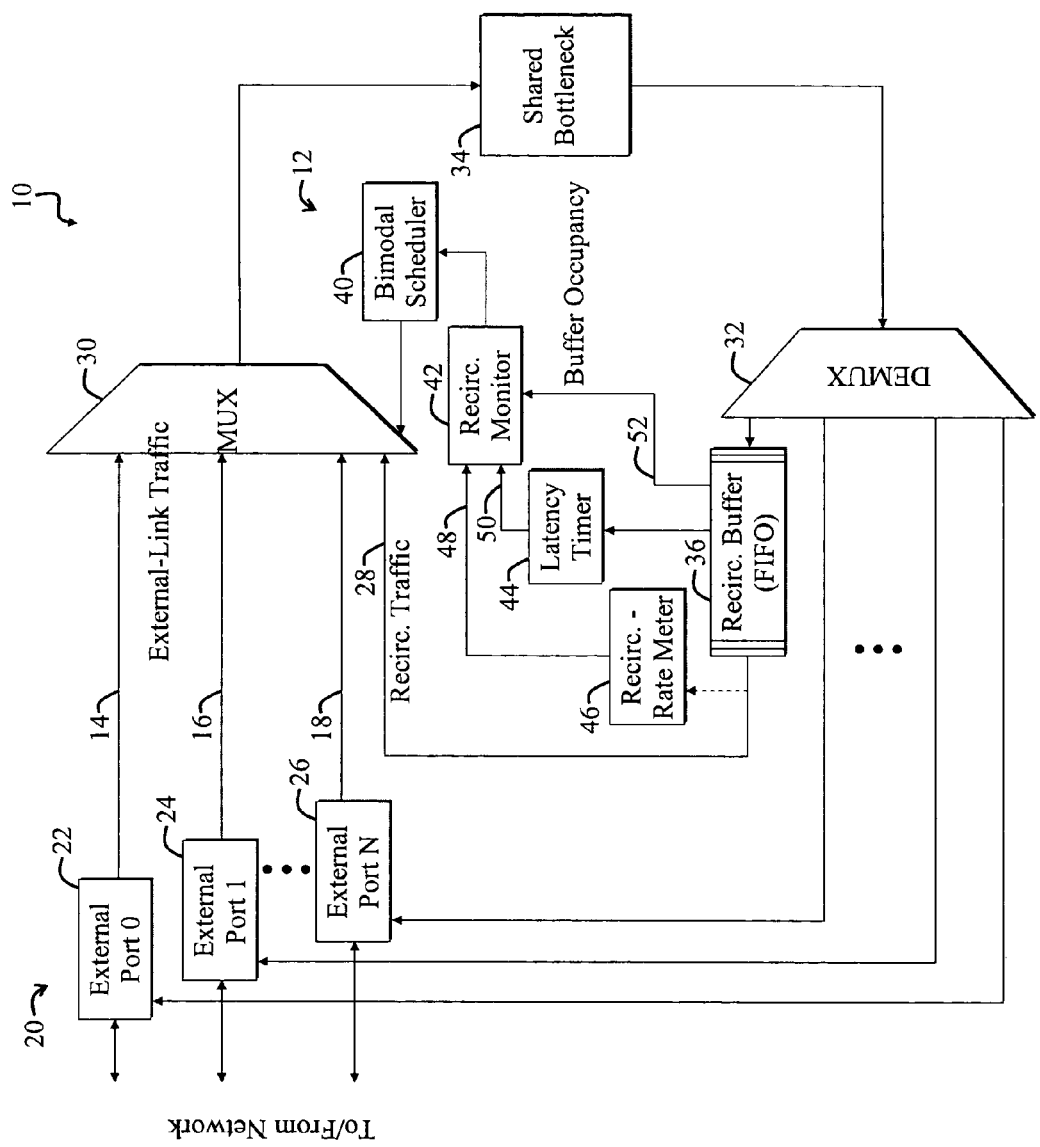
FIG. 1 is a diagram of a switch employing a system for selectively scheduling external-link traffic and recirculation traffic according to a first embodiment of the present invention.

FIG. 1 is a diagram of a switch 10 employing a system 12 for selectively scheduling external-link traffic 14, 16, 18 and recirculation traffic 28 according to a first embodiment of the present invention. The switch 10 includes various external ports 20, including a zeroth external port 22, a first external port 24, and an $N^{th}$ external port 26, which send and receive external-link traffic to and from an outside network (not shown). For the purposes of the present discussion, external-link traffic may be any traffic sent between a network device, such as the switch 10, and an entity that is external to the network device.

A switch may be employed to affect how traffic flows over a network. Examples of switches include Layer-2 (L2), Layer-3 (L3), and multilayer switches and routers. These devices are named in accordance with the Open Systems Interconnection (OSI) layer associated with the devices' operations. For example, an L2 switch performs various OSI-layer-2 (data layer) functions, such as defining packet sequencing and routing packets based on Media Access Control (MAC) addresses. Similarly, an L3 switch performs various functions associated with layer-3 (network layer) of the OSI standard model, which may include implementing various routing protocols. Multilayer devices may perform functions associated with multiple layers of the OSI standard. A router performs various layer-3 functions, and consequently, is often considered to be a type of layer-3 switch.

The external ports 20 output packets or cells to a first multiplexer (MUX) 30. A cell may be a predetermined unit of information that is sized and formatted for use by memory devices, such as buffers, or other devices within a switch, such as the switch 10. Various data-formatting modules, such as packet-to-cell converters may be employed to facilitate formatting packets, frames, or other types of messages or data for use by the switch 10. Exact details pertaining to how data is formatted in a switch are application specific and may be determined by those skilled in the art with access to the present teachings without undue experimentation.

The switch 10 further includes a demultiplexer (DEMUX) 32 and a shared bottleneck 34, which is connected between an output of the first multiplexer 30 and an input of the demultiplexer 32. The shared bottleneck 34 may represent various internal switch components, such as parsing modules, forwarding engines, and so on. A recirculation First-In-First-Out (FIFO) buffer 36 is connected between an output of the demultiplexer 32 and an input of the multiplexer 30.

For the purposes of the present discussion, a recirculation buffer may be any memory, such as a FIFO buffer, that is employed to collect or otherwise selectively delay transmission of packets being input to the buffer.

The system 12 for selectively scheduling external-link traffic 14, 16, 18 and recirculation traffic 28 includes a bimodal scheduler 40, which receives input from a recirculation monitor 42, also called a traffic monitor, and outputs traffic-scheduling signals, i.e., controls signals to the multiplexer 30. The recirculation monitor 42, which may be incorporated into the bimodal scheduler 40, without departing from the scope of the present invention, receives input from a latency timer 44, a recirculation-rate meter 46, and receives buffer-occupancy information 52 from the recirculation buffer 36. The latency timer 44 is coupled to the recirculation buffer 36 and is adapted to measure delays associated with recirculation cells or packets passing through the recirculation buffer 36, and/or to measure the duration of time during which recirculation packets remain in the recirculation buffer 36. The fullness of the recirculation buffer 36, as indicated by the buffer-occupancy information 52, provides an indication of how backed up the recirculation buffer 36 is with cells or other units of recirculation traffic, thereby indicating an amount of cells or data within the recirculation buffer 36.

The output of the recirculation buffer 36 represents recirculation traffic 28, also called internal-link traffic or tunneling traffic, which is returned back the multiplexer 30 and the shared bottleneck 34 for further processing. The further processing may involve removal or modification of packet tunnel headers. For the purposes of the present discussion, internal-link traffic may be any traffic that is passed between modules or passed in a loop within a switch, such as traffic that is recirculated within a network device or recirculated between an output and input of the network device. Examples of internal-link traffic include tunneling traffic and other traffic involving packets that must be modified by an associated switch. The terms internal-link traffic and recirculation traffic are employed interchangeably.

In operation, in the present specific embodiment, both external-link traffic 14-18 and recirculation traffic 18 may pass through the shared bottleneck 34, which is characterized by a switch bandwidth. The switch bandwidth may be the capacity or throughput capability of the shared bottleneck 34 in terms of bit rate. However, in some applications, bandwidth may be measured in terms of packet rate, frame rate, or other types of rate measurements. Maximum values may be established for packet rate, frame rate, and/or bit rate through the switch 10. Generally, in the present embodiment, the maximum bit rate through the shared bottleneck 34 corresponds to the total bandwidth of the switch 10.

The total switch bandwidth is shared between the external-link traffic 14-18 and the recirculation traffic 28. Generally, the bimodal scheduler 40 implements one or more routines to control the multiplexer 30 so that capacity or bandwidth that is not used for external-link traffic 14-18, i.e., surplus capacity, is employed for recirculation traffic 28 on a best-effort or opportunistic basis when the switch 10 is in a first operational mode as controlled by the bimodal scheduler 40. When in the first operational mode, the bimodal scheduler 40 prioritizes external-link traffic 14-18 over recirculation traffic 28 when the switch 10 is oversubscribed. For the purposes of the present discussion, surplus bandwidth or capacity may be the difference between the total switch bandwidth and the bandwidth used for external-link traffic.

Prioritizing a first type of traffic, such as external-link traffic 14-18, above or over other traffic, such as recirculation traffic 28, may mean that bandwidth demands of the first type of traffic are met before bandwidth demands of the second type of traffic. For example, the bandwidth demands of the first type of traffic may be met by allocating bandwidth to the first type of traffic before allocating bandwidth to the second type of traffic or by sacrificing bandwidth used by the second type of traffic and using the sacrificed bandwidth for the first type of traffic.

The recirculation monitor 42 monitors the rate, such as bit rate, at the output of the recirculation buffer 36 to determine a rate associated with the recirculation traffic 28. The recirculation-rate meter traffic 28 may be implemented via a virtual time shaper. Virtual time shapers are known in the art.

The latency timer 44 measures the delay associated with packets or cells passing through the recirculation buffer 36. The recirculation-rate meter 46, the recirculation buffer 36, and the latency timer 44 provide recirculation rate information, congestion information, and latency information, respectively, to the recirculation monitor 42. The recirculation monitor 42 then runs one or more routines for determining whether the bimodal scheduler 40 should transition to a second mode or not.

The recirculation monitor 42 is a type of traffic monitor. For the purposes of the present discussion, a traffic monitor may be any entity, such as a hardware and/or software module, that senses and/or tracks one or more traffic characteristics, such as latency or data rate, or conditions associated with any type of network traffic, such as recirculation traffic.

In one embodiment, the recirculation monitor 42 causes the bimodal scheduler 40 to transition to a second operational mode when the latency timer 44 has expired or the recirculation buffer 36 is backed up by a predetermined amount, i.e., contains more than a predetermined number of recirculation packets, during a time at which the recirculation bit rate has dropped below a predetermined threshold rate. Parameters of the latency timer 44 are set so that if the latency timer 44 expires, the service resulting from the mode transition of the bimodal scheduler 40 (from a first mode to a second mode) meets the predetermined maximum latency requirement. The parameters of the recirculation-rate meter 46 (from the first mode to the second mode) are set such that the service resulting from the mode transition of the bimodal scheduler 40 meets the predetermined committed rate.

When operating in the second operational mode, the bimodal scheduler 40 ensures that recirculation traffic is not delayed more than a predetermined latency threshold and that the bit rate at the output of the recirculation buffer 36 does not fall below a predetermined minimum recirculation rate for a substantial period of time when recirculation traffic is demanded.

Traffic is said to be demanded when data or packets pertaining to the traffic are employing or waiting to employ bandwidth of a network entity, such as the switch 10 or other device.

In an exemplary specific implementation, the latency timer 44 starts ticking when the recirculation buffer 36 is not empty and when the bimodal scheduler 40 is not in the second operational mode, i.e., is in the first operational mode. In the second operational mode, the recirculation traffic is prioritized above external-link traffic. In this implementation, the bimodal scheduler 40 enters the second operational mode when the latency timer 44 expires or a minimum guaranteed service rate for recirculation traffic has not been met, i.e., when the recirculation-traffic service rate is below a committed recirculation-traffic service rate while recirculation traffic is backed up in the recirculation buffer 36 by a predetermined buffer-occupancy threshold level.

Use of the latency timer 44 is particularly useful in conditions wherein the recirculation traffic 28 is minimal and a relatively small amount of data pertaining to recirculation traffic is queued in the recirculation buffer 36. Without use of the latency timer 44, some implementations would result in recirculation data remaining in the recirculation buffer 36 for undesirably lengthy periods of time. Use of the latency timer 44 facilitates bounding latency in such situations.

Hence, the system 12 employs unused switch capacity for recirculation traffic on an opportunistic basis and provides additional service to recirculation ports if recirculation traffic fails to meet certain criteria, such as latency criteria and/or bit rate criteria. The system 12 selectively transitions between the first mode, wherein recirculation traffic gets so-called best-effort service, and the second mode, wherein recirculation traffic is prioritized over external-link traffic.

The system 12 may be considered to be a system for selectively controlling bandwidth allocated by a switch, such as the switch 10. In this case, the system 12 comprises a first mechanism 30, 36 that distinguishes between, i.e., separates recirculation traffic 28 and external traffic 14-18. The terms external traffic and external-link traffic are employed interchangeably herein.

A second mechanism 44, 46, 52 measures bandwidth usage and latency of the recirculation traffic 28 and provides traffic information in response thereto. A third mechanism 40, 42 selectively prioritizes external traffic 14-18 over recirculation traffic 28 in response to a first condition based on the traffic information.

The traffic information may include a bit rate associated with recirculation traffic, latency associated with the recirculation traffic, available switch bandwidth, and so on. The terms traffic information and traffic characterization may employed interchangeably herein to refer to any information that characterizes or is otherwise associated with traffic. The first condition may be that the switch 10 is not sufficiently oversubscribed to cause the recirculation latency measured by the latency timer 44 to surpass a predetermined latency threshold when recirculation-rate meter 46 is below a certain guaranteed rate.

A fourth mechanism 40, 42 selectively prioritizes allocating switch bandwidth to the recirculation traffic above allocating switch bandwidth to the external traffic in response to a second condition based on the traffic information. The second condition may include the switch 10 being oversubscribed such that the recirculation traffic 28 is not service at a predetermined minimum data rate and recirculation traffic is congested, as indicated by the occupancy of recirculation buffer 36 being over a given buffer-occupancy threshold. For the purposes of the present discussion, the term data rate may include bit rate, packet rate, cell rate, and so on associated with a given type of traffic. The second condition may further include the recirculation traffic experiencing a latency or delay that is greater than a predetermined time.

Alternatively, the system 12 may be considered a system for managing bandwidth use in a device, such as the switch 10, that includes a first data scheduler 40 that is adapted to allot device bandwidth to external-link traffic 14-18 for passage through the device 10 before allotting device bandwidth to recirculation traffic 28. A recirculation monitor 42 is adapted to cause the first data scheduler 40 to provide bandwidth to recirculation traffic 28 when recirculation traffic 28 is delayed for a predetermined time, is backed up by a predetermined amount, and/or drops below a minimum rate.

In this case, the bandwidth provided to the recirculation traffic 28 represents a minimum bandwidth allotted for recirculation traffic. The recirculation buffer 36 buffers recirculation traffic. When the recirculation buffer 36 is filled to a predetermined level with data or packets pertaining to the recirculation traffic 28, the recirculation traffic 28 is considered backed-up.

Alternatively, the system 12 may be considered a system that includes a first data scheduler 40 that is adapted to share available switch bandwidth among recirculation traffic and external-link traffic. A second scheduler 42 runs one or more routines to cause the first data scheduler 40 to guarantee predetermined transmission characteristics for recirculation traffic. In this case, the first data scheduler 40 includes one or more routines for prioritizing external-link traffic above recirculation traffic when the network device, i.e., switch 10, is in a first operational mode and prioritizing the recirculation traffic 28 above external-link traffic 14-18 when the network device 10 is in a second operational mode. The minimum transmission characteristics include a minimum recirculation rate and a maximum amount or number of recirculation packets maintained in a buffer associated with the recirculation traffic, or a maximum latency or delay for the recirculation traffic 28.

Alternatively, the system 12 may be considered to be a system for managing bandwidth use in a device, wherein the system includes a rate meter 46 adapted to determine a data rate associated with internal-link traffic 28 and providing a first signal 48 in response thereto; a latency timer 44 adapted to determine a time for which internal-link traffic is delayed before being circulated through the device and providing a second signal 50 in response thereto; and a scheduler 40, 42 adapted to allot a minimum service bandwidth to internal-link traffic 14-18 when the data rate drops to or below a predetermined recirculation-rate threshold as indicated by the first signal 48, and/or when the time surpasses a predetermined latency threshold as indicated by the second signal 50.

Alternatively, the system 12 may be considered to be a system for prioritizing bandwidth in a network device, such as the switch 10, wherein the system 12 includes a first mechanism 40-50 for placing the network device 10 in a first operational mode in response to a first condition and placing the network device 10 in a second operational mode in response to a second condition. A second mechanism 40 assigns a first priority to external-link traffic 14-18 and a second priority to recirculation traffic 28, wherein the first priority is higher than the second priority when the network device 10 is in the first mode, and wherein the second priority is higher than the first priority when the device 10 is in the second mode.

The first condition, which is associated with the first operational mode, occurs when external-link traffic is not oversubscribed or is otherwise oversubscribed, but for not long enough to trigger the second operational mode. Hence, the first condition may occur when the external-link traffic is serviced at a rate less than the total device bandwidth minus a minimum bandwidth allotted to recirculation, when recirculation bandwidth is demanded. When recirculation traffic is not demanded, the first condition may occur when the external-link traffic is less than the total device bandwidth.

The second condition includes recirculation traffic service rate being less than a predetermined rate when recirculation bandwidth is demanded by recirculation traffic. The second condition further includes a delay experienced by recirculation traffic being greater than a predetermined latency threshold.

While the present embodiment is discussed with respect to selectively scheduling or servicing internal link traffic and external link traffic in a switch, embodiments of the present invention are not limited thereto. For example, certain embodiments of the present invention may be employed to selectively schedule traffic from different types of ports in any device or link that employs a shared path or otherwise shares bandwidth.

For the purposes of the present discussion, different types of ports may be ports that have different functions or ports that are associated with different priorities or are otherwise preferably serviced based on different rules and/or priorities. A port is said to be serviced if traffic output from the port is passed through a scheduling system, such as the system 12, or is otherwise delivered to or passed through another device or circuit, such as the shared bottleneck 34. A port may be any device, such as a buffer, or link through which traffic passes. A shared bottleneck may be any shared link, port, device, software program, and so on, which may receive traffic from plural sources, such as ports, that share the bottleneck.

For the purposes of the present discussion, a given type of traffic may be characterized by the type of port from which it comes. For example, external-link traffic is output by the external ports 22-26. Similarly, recirculation traffic is output from the recirculation buffer 36, which acts a recirculation port in the present specific embodiment. As another example, a first type of traffic is said to be traffic that comes from a first type of port. Similarly, a second type of traffic is said to be traffic that is output from a second type of port, and so on.

Figure 2:
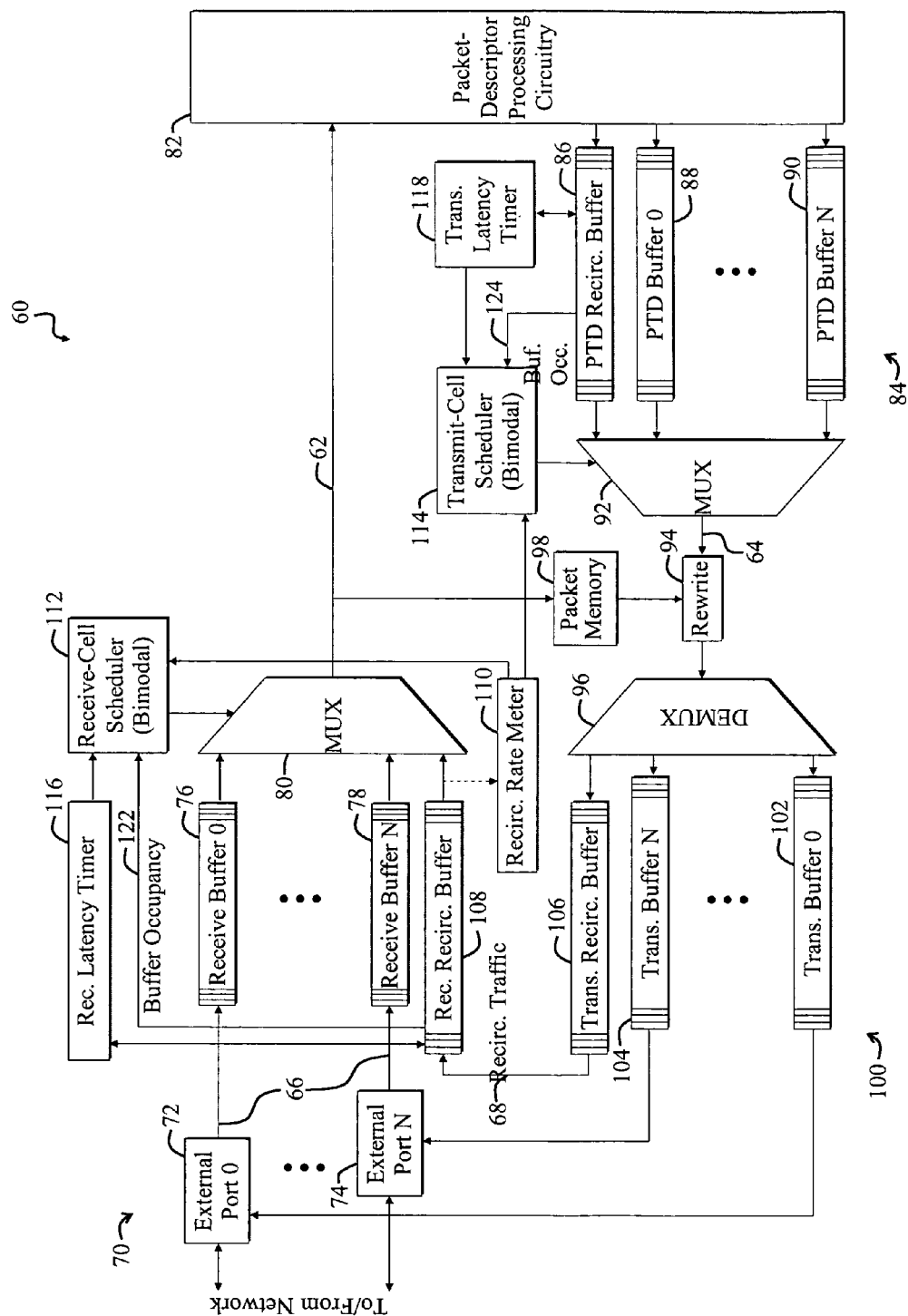
FIG. 2 is a diagram of a switch with plural traffic bottlenecks that is adapted to selectively schedule external-link traffic and recirculation traffic according to a second embodiment of the present invention.

FIG. 2 is a diagram of a switch 60 with plural traffic bottlenecks, including a receive-path bottleneck 62 and a transmit-path bottleneck 64. The switch 60 is adapted to selectively schedule external-link traffic 66 and recirculation traffic 68 according to a second embodiment of the present invention. The switch 60 includes plural external ports 70 for handling external-link traffic 66, including a zeroth port 72 and an $N^{th}$ port 74. A corresponding zeroth receive buffer 76 is connected between an output of the zeroth port 72 and an input of a receive-path multiplexer 80. Similarly, an $N^{th}$ receive buffer 78 is connected between an output of the $N^{th}$ port 74 and an input of the receive-path multiplexer 80.

An output of the receive-path multiplexer 80 is input to packet-descriptor processing circuitry 82, outputs of which are connected to inputs of plural Packet Transmit Descriptor (PTD) buffers 84. The PTD buffers 84 include a PTD recirculation buffer 86, a zeroth PTD external-link buffer 88, and an $N^{th}$ PTD external-link buffer 90. Outputs of the PTD buffers 84 are input to a transmit-path multiplexer 92, the output of which represents the transmit-path bottleneck 64. The transmit-path bottleneck 64 passes through a rewrite module 94, an output of which is input to a transmit-path demultiplexer 96. The rewrite module 94 also receives input from a packet memory 98 that is connected between an input of the rewrite module 94 and an output of the receive-path multiplexer 80.

Various transmit-path buffers 100, including a zeroth transmit-path buffer 102 and an $N^{th}$ transmit-path buffer 104 are connected between outputs of the transmit-path demultiplexer 96 and inputs of the corresponding zeroth port 72 and $N^{th}$ port 74, respectively. A transmit-path recirculation buffer 106 is connected between an output of the demultiplexer 96 and an input of a receive-path recirculation buffer 108. An output of the receive-path recirculation buffer 108 is input to the receive-path multiplexer 80. The receive-path recirculation buffer 108 and the transmit-path recirculation buffer 106 are considered part of a recirculation path that accommodates recirculation traffic 68.

The switch 60 is equipped with a scheduling system for selectively controlling traffic through the receive-path bottleneck 62 and the transmit-path bottleneck 64. The system includes a recirculation-rate meter 110 that measures the bit rate of recirculation traffic at the output of the receive-path recirculation buffer 108 and provides recirculation-rate information to a bimodal receive-cell scheduler 112 and a bimodal transmit-cell scheduler 114. The bit rate at the output of the receive-path recirculation buffer 108 is also called the dequeue rate of the receive-path recirculation buffer 108.

A first receive-path latency timer 116 monitors the receive-path recirculation buffer 108 and provides latency information pertaining to recirculation traffic to the receive-cell scheduler 112. Latency information may include information pertaining to delays experienced by data transiting the receive-path recirculation buffer 108. Buffer-occupancy information 122 may be provided to the receive-cell scheduler 112 directly from the receive-path recirculation buffer 108.

Similarly, a transmit-path latency timer 118 monitors the PTD recirculation buffer 86 and provides latency information to the transmit-cell scheduler 14 pertaining to recirculation traffic in the PTD recirculation buffer 86. Additional buffer-occupancy information 124 pertaining to recirculation traffic in the PTD recirculation buffer 86 is provided directly from the PTD recirculation buffer 86 to the transmit-cell scheduler 114.

In operation, external-link traffic 66 and recirculation traffic 68 share the receive-path bottleneck 62, which has a predetermined maximum bandwidth that can be allocated to receive traffic 68 and external-link traffic 66. The first receive-cell scheduler 112 measures the recirculation rate at the output of the receive-path recirculation buffer 108 via the recirculation-rate meter 110 and measures latency information, such as receive-path cell delay, via the receive-path latency timer 116 to determine which operational mode to employ. The receive-cell scheduler 112 is adapted to ensure that when certain latency criteria are met, such as when data in the receive-path recirculation buffer 108 is delayed by a predetermined amount of time or backed up by a predetermined amount or when the recirculation traffic is being serviced at a rate less than a predetermined committed rate, then recirculation traffic is transferred through the multiplexer 80 and through the shared bottleneck 62 at the predetermined minimum committed rate.

Transfer of traffic through the multiplexer 80 is controlled via control signals issued by the receive-cell scheduler 112. The receive-cell scheduler 112 enters a second operational mode when the latency criterion or criteria are met or when the recirculation rate, also called recirculation service rate, which is measured by the recirculation meter 110, falls below a predetermined rate, called the committed rate, while recirculation traffic is backed up by a predetermined amount in the receive-path recirculation buffer 108. In the second operational mode, recirculation traffic is prioritized above external-link traffic as needed to ensure maximum latency and minimum data rates for recirculation traffic. When the latency criterion or criteria and minimum data rate or bit rate criterion or criteria are not met, then either no recirculation bandwidth is demanded, or the external link bandwidth is sacrificed for recirculation traffic to increase recirculation traffic to a desired level. When recirculation bandwidth is demanded, recirculation data corresponding to recirculation traffic is present in the receive-path recirculation buffer 108.

When the latency criteria or recirculation bit rate and buffer-occupancy criteria are not met, and the receive-cell scheduler 112 is not already in the first operational mode, then the receive-cell scheduler 112 enters the first operational mode. When in the first operational mode, the receive-cell scheduler 112 prioritizes external-link traffic 66 above recirculation traffic 68 so that recirculation traffic 68 is allotted otherwise unused bandwidth of the bottleneck 62. The unused bandwidth, also called the surplus bandwidth, represents the capacity of the bottleneck 62 minus the portion of the bottleneck capacity employed for external-link traffic 66.

Generally, the latency criteria and recirculation rate criteria necessary to cause the receive-cell scheduler 112 to enter the second operational mode occur when the switch 60 is oversubscribed. In a specific implementation, the switch 60 may become oversubscribed when external-link traffic 66 uses most of the capacity of the shared bottleneck 62, so that the bit rate associated with the recirculation traffic 68 drops to zero for a predetermined latency time interval, i.e., latency threshold, or drops below a rate threshold for the predetermined latency time interval. When the switch 60 is oversubscribed, recirculation traffic may back up in the receive-path recirculation buffer 108 by a predetermined amount, which may also be employed to trigger the receive-cell scheduler 112 to enter the second operational mode, without departing from the scope of the present invention.

Exact details for determining rate information, such as periods over which to average rate measurements, and details for measuring latency information, such as whether to measure buffer levels and/or delay times, are application specific. Those skilled in the art with access to the present teachings will know which details to employ to meet the needs of a given application without undue experimentation.

The operation of the transmit-cell scheduler 114 is similar to the operation of the receive-cell scheduler 112 with the exception that the transmit-cell scheduler 114 controls the operation of the transmit-path multiplexer 92 based on recirculation traffic data rate as output by the recirculation rate meter 110 in addition to latency information as measured by the transmit-path latency timer 118 at the PTD recirculation buffer 86.

Hence, the switch 60 of FIG. 2 employs the receive-cell scheduler 112 and the transmit-cell scheduler 114 to opportunistically use any unused external-link bandwidth for recirculation traffic. The full bandwidth of the switch 60 is rarely used in peak traffic conditions. Accordingly, the schedulers 112, 114 allow the switch bandwidth used for external links to be increased to the entire switch bandwidth, corresponding to the capacity, i.e., traffic throughput capability, of the shared bottlenecks 62, 64. Consequently, if ingress external-link traffic and recirculation traffic oversubscribes the switch 60 for a sustained period, i.e., latency interval, the schedulers 112, 114 adapt to provide more bandwidth to service recirculation traffic.

Generally, the scheduling policy of the schedulers 112, 114 in the present specific embodiment may be summarized as implementing a minimum recirculation service rate as needed, i.e., only if recirculation traffic is present; implementing a maximum latency for recirculation traffic; and prioritizing external link bandwidth above recirculation bandwidth unless bandwidth conditions require the minimum recirculation service rate or unless bandwidth conditions require implementation of a certain maximum latency for recirculation traffic.

Either the minimum recirculation service-rate guarantee or the maximum-latency guarantee may be omitted without departing from the scope of the present invention. If the minimum recirculation-rate guarantee is omitted, then, for example, the receive-cell scheduler 112 only adjusts traffic through the multiplexer 80 to ensure that recirculation traffic passing through the receive-path recirculation buffer 108 is not delayed by a predetermined time interval. If the maximum-latency guarantee is omitted, then, for example, the receive-cell scheduler 112 adjusts traffic through the multiplexer 80 to ensure that recirculation traffic passing through the receive-path recirculation buffer 108 is passed through at a certain minimum rate when recirculation traffic is present. The scheduler 112 may sacrifice external-link traffic to ensure that certain recirculation service-rate minimums and/or maximum latency values are met. Hence, schedulers constructed according to embodiments of the present invention may be readily adapted to control traffic passing through various bottlenecks in a given network device.

While the embodiment of FIG. 2 employs bimodal schedulers 112, 114 for two types of traffic, namely recirculation traffic and external-link traffic, schedulers with more than two modes may be employed without departing from the scope of the present invention. For example, the bimodal schedulers 112, 114 may be replaced with schedulers that implement separate modes for each external port 70. For example, in certain applications and conditions, traffic from one external port may be preferably sacrificed before traffic from another external port so as to meet minimum transmission characteristics for recirculation traffic.

Figure 3:
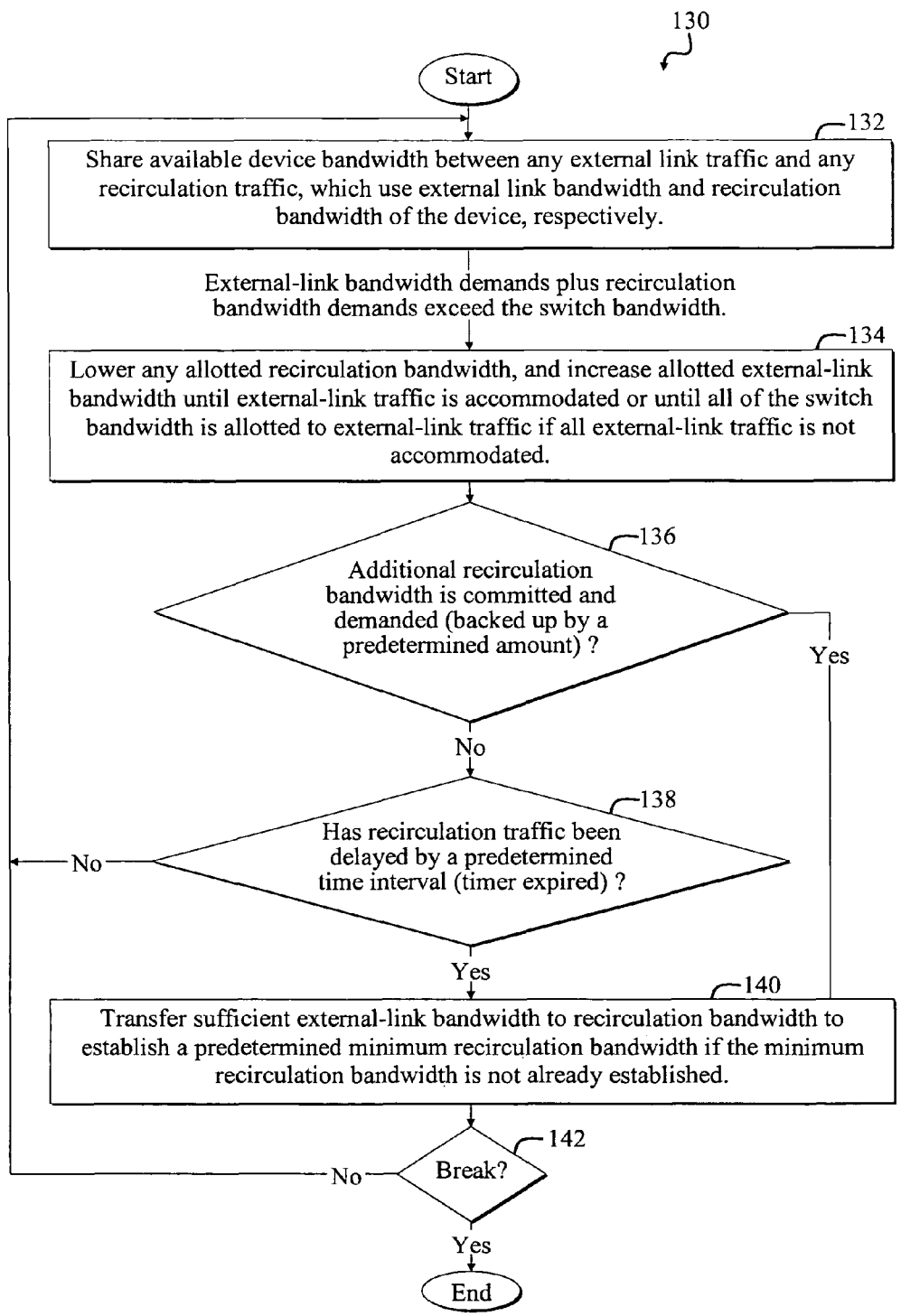
FIG. 3 is a flow diagram of a method adapted for use with the switches of FIGS. 1 and 2.

FIG. 3 is a flow diagram of a method 130 adapted for use with the switches 10, 60 of FIGS. 1 and 2. In the present specific embodiment, the method 130 includes an initial bandwidth-sharing step 132, wherein available device bandwidth is shared between any external-link traffic and any recirculation traffic on an as-needed basis such that external-link traffic is given higher priority than internal-link traffic when an accompanying switch or shared bottleneck is oversubscribed or at capacity.

For the purposes of the present discussion, traffic is said to be shared on an as-needed basis, or ports are said to be serviced on an as-needed basis, when the traffic is allotted shared resources, such as a shared bottleneck or link, as servicing is demanded by the traffic or associated port. For example, in cases where total bandwidth demanded by various ports is substantially less than the capacity of a bottleneck shared by the ports, certain embodiments of the present invention may service the ports, on an as-needed basis, by allotting bandwidth to the ports as the bandwidth is demanded by the ports, without restricting the bandwidth allotted to a given type of port.

Hence, in the present specific embodiment, in a first mode of operation, available bandwidth of a shared bottleneck may be used by internal-link traffic or external-link traffic on an as-needed basis, provided that one or more predetermined criteria for switching modes are not met as discussed more fully below.

A subsequent bandwidth-allotting step 134 is performed when external-link bandwidth demands plus recirculation bandwidth demands exceed the bandwidth of the switch, which corresponds to the capacity of a bottleneck in the switch. The bandwidth-allotting step 134 involves lowering any allotted recirculation bandwidth and increasing allotted external-link bandwidth until external-link traffic is accommodated or until all of the switch bandwidth is allotted to external-link traffic if all external-link traffic is not otherwise accommodated.

Next, a recirculation-demand-checking step 136 determines if recirculation bandwidth is committed and demanded. For the purposes of the present discussion, recirculation traffic is said to be committed when the service rate of the recirculation traffic, i.e., the recirculation rate is below a predetermined committed rate. Traffic is said to be demanded if recirculation traffic is waiting to pass through the shared bottleneck of the switch, and the recirculation traffic is backed up by a predetermined amount. Recirculation traffic is said to be backed up by a predetermined amount if the corresponding recirculation buffer is filled past a predetermined level.

If no recirculation traffic is committed and demanded, then a subsequent latency-checking step 138 is performed. Otherwise, if recirculation traffic is committed and demanded, then a subsequent bandwidth-transferring step 140 is performed.

The latency-checking step 138 includes determining if recirculation traffic has been delayed by a predetermined time interval corresponding to one or more latency thresholds. If one or more latency thresholds is/are surpassed, then the bandwidth-transferring step 140 is performed. Otherwise, the bandwidth-sharing step 132 continues.

The bandwidth-transferring step 140 includes transferring sufficient external-link bandwidth to recirculation bandwidth to establish a predetermined minimum recirculation bandwidth if the minimum recirculation bandwidth is not already established. Hence, the bandwidth-transferring step 140 corresponds to the accompanying switch entering a second operational mode when the following is true for recirculation traffic: (service rate<committed rate) AND (recirculation buffer occupancy>recirculation buffer occupancy threshold)) OR (latency>latency threshold).

Subsequently, a break-checking step 142 is performed. A system-break occurs if the accompanying device or switch is disabled or the accompanying traffic-scheduling system is otherwise disabled. If a system break occurs, the method 130 completes. Otherwise, the bandwidth-sharing step 132 continues.

Figure 4:
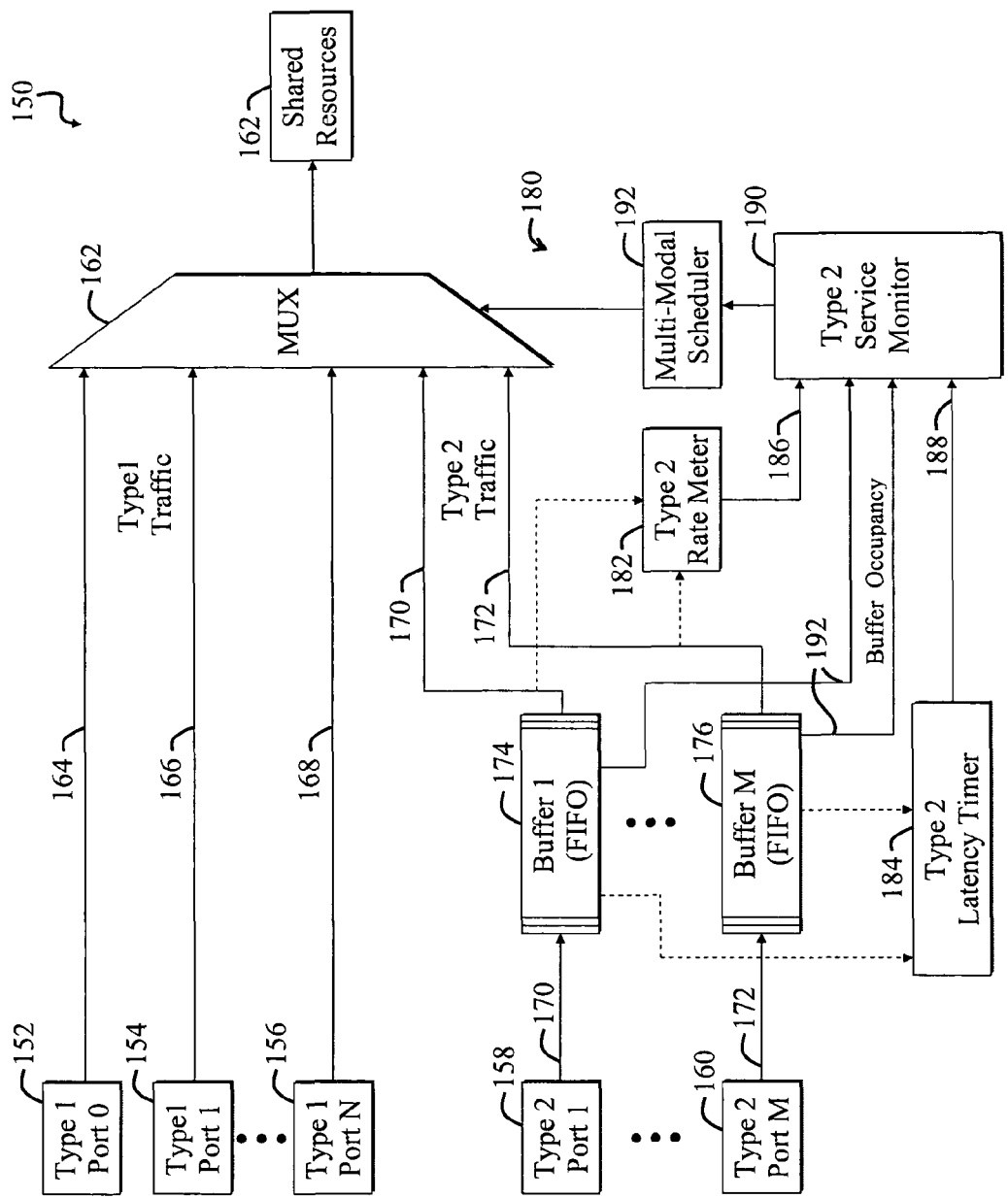
FIG. 4 is a diagram of a system for selectively scheduling traffic from first types of ports and second types of ports to pass through a shared bottleneck according to a third embodiment of the present invention.

Various steps 130-142 of the method 130 may be omitted, changed, or reordered without departing from the scope of the present invention. For example, the method 130 may be replaced with a more generalized method. An exemplary more generalized method involves: if a first type of traffic is at or below a predetermined bandwidth level, which is less than the total device bandwidth, then use remaining bandwidth as needed to accommodate a second type of traffic, and if the first type of traffic surpasses the predetermined bandwidth level, and the second type of traffic is backed up as defined by the satisfaction of a predetermined criteria, then throttle the first type of traffic to allow more bandwidth for the second type of traffic. Another exemplary generalized method involves implementing a first operational mode when the network device is not oversubscribed as determined by a predetermined criteria, wherein the first operational mode includes sharing switch bandwidth between a first type of traffic and a second type of traffic on an as-needed basis, and transitioning to a second operational mode when the network device becomes oversubscribed as determined by the predetermined criteria, wherein the second operational mode involves guaranteeing a predetermined minimum transmission rate and/or latency for the second type of traffic FIG. 4 is a diagram of a system 150 for selectively scheduling traffic from first types of ports 152-156 and second types of ports 158-160 to pass through shared resources according to a third embodiment of the present invention. The system 150 includes a central MUX 162 that receives type-one traffic 164-168 from the first types of ports 152-156, respectively. The central MUX 162 receives type-two traffic 170, 172 from buffers 174, 176 that buffer the type-two traffic 170, 172 at the outputs of the second types of ports 158-160.

The scheduling system 150 includes MUX-control circuitry 180 that includes a type-two service-rate meter 182, and a type-two latency timer 184, which provide service-rate information 186 and latency information 188, corresponding to the type-two traffic 170, 172, to a type-two service monitor 190. The type-two service monitor 190 also receives type-two buffer-occupancy information 192 directly from the buffers 174, 176.

In operation, the type-two service monitor 190 monitors buffer-occupancy information 192, service rate 186, and latency information 188 to determine when predetermined criteria are met to cause the system 150 to switch modes. When the predetermined criteria are met, the type-two service monitor 190 sends an appropriate signal to a multi-modal scheduler 192, which provides control signals to the MUX 162 to control use of the shared resources 162 by the various ports 152-160.

Hence, the traffic-scheduling system 150 of FIG. 4 selectively schedules traffic from two types of ports. One type of traffic 170, 172 is buffered by the buffers 174, 176, while the other type of traffic 164-168 is not buffered. Generally, the multi-modal scheduler 192 runs one or more routines to selectively give scheduling to traffic from the buffered ports 158, 160 to ensure minimum latency and minimum transmission-rate characteristics for the type-two traffic 170, 172 when the shared resources 162 are above capacity, i.e., when the shared resources 162 are over subscribed. When the shared resources 162 are not used to capacity by the different types of traffic 164-172, the multi-modal scheduler 192 services traffic 164-172 from the various ports 152-160 on an as-needed basis. The construction and operation of the traffic-scheduling system 150 is generalized and not limited to use with recirculation traffic and external-link traffic.

Certain devices, such as switches may particularly benefit from having plural types of ports, with one type of port not being buffered or being less buffered than another type of port. For example, in certain applications, buffers associated with one type of port, such as the type-one ports 152-156, may be eliminated or reduced, thereby reducing costs. Furthermore, such ports may have more stringent latency requirements (may require lower latency) than other types of ports, such as the type-two ports 170, 172. Type-two ports 170, 172 may utilize the buffers 174, 176 to absorb high peak-data-rate traffic under bursty traffic conditions.

The system 150 may be considered a strict-priority multi-modal scheduler such that in one mode, traffic 164-168 provided by the type-one ports 152-156 is serviced at a higher priority than traffic 170-172 from the type-two ports 158, 160. In a second mode, the servicing priorities are switched such that traffic 164-168 provided by the type-one ports 152-156 is serviced at lower priority than traffic 170-172 from the type-two ports 158, 160.

While various embodiments are discussed with respect to bimodal scheduling for two types of traffic, such as external link traffic and recirculation traffic, embodiments of the present invention are not limited thereto. For example, any n types of traffic may be scheduled by an embodiment of the present invention with m scheduling modes, where n and m may be any integers.

For example, an embodiment with four recirculation ports may be adapted to independently control each recirculation port, so that each recirculation port has its own criteria for determining when priority should be given to that port over another port, such as one of four external-link ports. In such an embodiment, four independently controlled recirculation ports and four independently controlled external-link ports may yield, for example, sixteen different scheduling modes. Such a configuration may yield more or fewer than sixteen different scheduling modes without departing from the scope of the present invention.

In a first illustrative implementation of this embodiment, the plural modes may be configured so that bandwidth of a shared bottleneck is shared between the four external-link ports and the four recirculation ports on an as-needed basis, with the external ports serviced at a higher priority when the shared bottleneck is at capacity, until one or more criteria are met to switch modes. For example, if a first recirculation port is serviced at a rate that is lower than a predetermined minimum committed rate, and the occupancy of a buffer associated with the recirculation port is above a predetermined buffer-occupancy threshold, then the multi-modal scheduler may switch to servicing the first recirculation port at a higher priority than one or more of the external-link ports. Similarly, if the latency associated with traffic output from the first recirculation port is greater than a predetermined latency threshold, then the multi-modal scheduler may switch to servicing the first recirculation port at a higher priority than one or more of the external-link ports.

While certain embodiments have been discussed with respect to bit rates or packet rates associated with recirculation traffic and external-link traffic, embodiments of the present invention are not limited thereto. For example, any traffic that may be separated or categorized according to certain criteria and then sent through a switch or other network device that has a certain amount of bandwidth, may benefit from embodiments of the present invention.

Furthermore, different types of rates may be employed to determine bandwidth and to determine the behavior of an accompanying traffic-scheduling system. For example, certain network devices may have packet look-up rate bottlenecks in addition to or instead of bit-rate bottlenecks. Packet look-up rate bottlenecks may require that packet-transmission rate or cell-transmission rate be below a certain maximum level, which may or may not correspond to a maximum bit rate. Whether or not a maximum packet-transmission rate corresponds to a maximum bit rate may depend on packet sizes, cell sizes, or the sizes of other transmission units.

In an alternative method, all traffic, including external-link traffic and recirculation traffic, through a network bottleneck is initially treated equally until a switch be comes oversubscribed due to extra external-link traffic, i.e. more external link bandwidth is demanded than the device can provide. In this case, recirculation traffic is sacrificed until a minimum recirculation rate is reached.

Alternatively, if external-link traffic is at or below a predetermined bandwidth level, which is less than the switch bandwidth, then remaining bandwidth is used as needed for recirculation traffic. However, if external-link traffic surpasses the predetermined bandwidth level, and recirculation traffic gets backed up by a predetermined criterion or criteria, then external-link traffic is throttled back to allow more bandwidth for recirculation traffic.

Alternatively, latency requirement is dropped, and instead, bandwidth that is allotted to external-link traffic is limited to the total switch bandwidth less the minimum bandwidth allocated for recirculation traffic when recirculation bandwidth is demanded by recirculation traffic. When no recirculation bandwidth is demanded, i.e., no recirculation traffic exists, then the entire switch bandwidth may be allotted as needed for external-link traffic.

While embodiments disclosed herein have been discussed primarily with respect to switches, other types of network devices through which different types of traffic pass may employ embodiments for selectively scheduling the traffic according to embodiments of the present invention.

Although a process of the present invention may be presented as a single entity, such as software or hardware routines executing on a single machine or module, such software or hardware routines can readily be executed on multiple machines or modules. That is, there may be multiple instances of a given software program, a single program may be executing on two or more processors in a distributed processing environment, parts of a single program may be executing on different physical machines, etc. Furthermore, different programs can be executing in a single machine or in different machines.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, machine language, and so on. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus comprising:
   a first data scheduler configured to share available device bandwidth among a first type of traffic and a second type of traffic on an as-needed basis, wherein the first type of traffic includes external-link traffic arriving from outside of the apparatus, and wherein the second type of traffic includes recirculation traffic, the recirculation traffic comprising portions of the external-link traffic that has passed through the apparatus and are being recirculated through the apparatus; and a traffic monitor in communication with the first data scheduler, wherein the traffic monitor monitors bandwidth usage of the second type of traffic and latency of the second type of traffic and provides a traffic control signal to the first data scheduler, the traffic control signal generated based on the monitored bandwidth usage and latency of the second type of traffic, wherein the first data scheduler is configured to provide a service guarantee with regard to one or more pre-determined transmission characteristics for the recirculation traffic by:

dynamically prioritizing the external-link traffic above the recirculation traffic in response to the traffic control signal indicating a first condition, and dynamically prioritizing the recirculation traffic above the external-link traffic in response to the traffic control signal indicating a second condition, wherein the first condition includes one of: the external-link traffic being served at a rate less than a total device bandwidth minus a predetermined minimum bandwidth allotted to the recirculation traffic, during a period in which the recirculation traffic is demanded; or the external-link traffic being served at a rate less than a total device bandwidth during a period in which the recirculation traffic is not demanded, and wherein the second condition includes: the recirculation traffic being served at a rate that is at, equal to, or less than the predetermined minimum bandwidth allotted to the recirculation traffic when a buffer associated with the recirculation traffic is being occupied above a pre-determined threshold amount.

2. The apparatus of claim 1, wherein the traffic monitor is configured to guarantee the one or more predetermined transmission characteristics for the second type of traffic when the apparatus is oversubscribed by the external-link traffic.

3. The apparatus of claim 1, wherein the one or more predetermined transmission characteristics include a minimum rate guarantee for servicing the second type of traffic.

4. The apparatus of claim 3, wherein the one or more predetermined transmission characteristics include a maximum occupancy of the buffer associated with the second type of traffic, and wherein the one or more predetermined transmission characteristics further include a minimum transmission rate associated with the second type of traffic.

5. The apparatus of claim 4, wherein the buffer includes a first-in-first-out (FIFO) buffer positioned in a path of the recirculation traffic.

6. The apparatus of claim 1, wherein the one or more predetermined transmission characteristics include a maximum latency for the second type of traffic.

7. The apparatus of claim 1, wherein the first type of traffic includes traffic provided by an external port, and wherein the second type of traffic includes traffic provided by a recirculation port.

8. The apparatus of claim 1, wherein the second condition further includes: the recirculation traffic experiences a latency above a pre-determined maximum latency for the recirculation traffic.

9. A computer-implemented method, comprising:

sharing available bandwidth of a device among a first type of traffic and a second type of traffic on an as-needed basis, wherein the first type of traffic includes external-link traffic arriving from outside of the device, and wherein the second type of traffic includes recirculation traffic, the recirculation traffic comprising portions of the external-link traffic that has passed through the device and are being recirculated through the device;

monitoring bandwidth usage of the second type of traffic and latency of the second type of traffic to provide a traffic control signal, the traffic control signal generated based on the monitored bandwidth usage and latency of the second type of traffic; and providing a service guarantee with regard to one or more pre-determined transmission characteristics for the recirculation traffic by:

dynamically prioritizing the external-link traffic above the recirculation traffic in response to the traffic control signal indicating a first condition, and dynamically prioritizing the recirculation traffic above the external-link traffic in response to the traffic control signal indicating a second condition, wherein the first condition includes one of: the external-link traffic being served at a rate less than a total device bandwidth minus a predetermined minimum bandwidth allotted to the recirculation traffic, during a period in which the recirculation traffic is demanded; or the external-link traffic being served at a rate less than a total device bandwidth during a period in which the recirculation traffic is not demanded, and wherein the second condition includes: the recirculation traffic being served at a rate that is at, equal to, or less than the predetermined minimum bandwidth allotted to the recirculation traffic when a buffer associated with the recirculation traffic is being occupied above a pre-determined threshold amount.

10. The method of claim 9, wherein the service guarantee provides the one or more predetermined transmission characteristics for the second type of traffic when the device is oversubscribed by the external-link traffic.

11. The method of claim 9, wherein the one or more predetermined transmission characteristics include a minimum rate guarantee for servicing the second type of traffic.

12. The method of claim 11, wherein the one or more predetermined transmission characteristics include a maximum occupancy of the buffer associated with the second type of traffic, and wherein the one or more predetermined transmission characteristics further include a minimum transmission rate associated with the second type of traffic.

13. The method of claim 12, wherein the buffer includes a first-in-first-out (FIFO) buffer positioned in a path of the recirculation traffic.

14. The method of claim 9, wherein the one or more predetermined transmission characteristics include a maximum latency for the second type of traffic.

15. The method of claim 9, wherein the first type of traffic includes traffic provided by an external port, and wherein the second type of traffic includes traffic provided by a recirculation port.

16. The method of claim 9, wherein the second condition further includes: the recirculation traffic experiences a latency above a pre-determined maximum latency for the recirculation traffic.

17. A non-transitory computer-readable medium storing software comprising instructions executable by one or more processors which, upon such execution, cause the one or more processors to perform operations comprising:

sharing available bandwidth of a device among a first type of traffic and a second type of traffic on an as-needed basis, wherein the first type of traffic includes external-link traffic arriving from outside of the device, and wherein the second type of traffic includes recirculation traffic, the recirculation traffic comprising portions of the external-link traffic that has passed through the device and are being recirculated through the device;

monitoring bandwidth usage of the second type of traffic and latency of the second type of traffic to provide a traffic control signal, the traffic control signal generated based on the monitored bandwidth usage and latency of the second type of traffic; and providing a service guarantee with regard to one or more pre-determined transmission characteristics for the recirculation traffic by:

dynamically prioritizing the external-link traffic above the recirculation traffic in response to the traffic control signal indicating a first condition, and dynamically prioritizing the recirculation traffic above the external-link traffic in response to the traffic control signal indicating a second condition, wherein the first condition includes one of: the external-link traffic being served at a rate less than a total device bandwidth minus a predetermined minimum bandwidth allotted to the recirculation traffic, during a period in which the recirculation traffic is demanded; or the external-link traffic being served at a rate less than a total device bandwidth during a period in which the recirculation traffic is not demanded, and wherein the second condition includes: the recirculation traffic being served at a rate that is at, equal to, or less than the predetermined minimum bandwidth allotted to the recirculation traffic when a buffer associated with the recirculation traffic is being occupied above a pre-determined threshold amount.

18. The computer-readable medium of claim 17, wherein the service guarantee provides the one or more predetermined transmission characteristics for the second type of traffic when the device is oversubscribed by the external-link traffic.

19. The computer-readable medium of claim 17, wherein the one or more predetermined transmission characteristics include a minimum rate guarantee for servicing the second type of traffic.

20. The computer-readable medium of claim 19, wherein the one or more predetermined transmission characteristics include a maximum occupancy of the buffer associated with the second type of traffic, and wherein the one or more predetermined transmission characteristics further include a minimum transmission rate associated with the second type of traffic.

21. The computer-readable medium of claim 20, wherein the buffer includes a first-in-first-out (FIFO) buffer positioned in a path of the recirculation traffic.

22. The computer-readable medium of claim 17, wherein the one or more predetermined transmission characteristics include a maximum latency for the second type of traffic.

23. The computer-readable medium of claim 17, wherein the first type of traffic includes traffic provided by an external port, and wherein the second type of traffic includes traffic provided by a recirculation port.

24. The computer-readable medium of claim 17, wherein the second condition further includes: the recirculation traffic experiences a latency above a pre-determined maximum latency for the recirculation traffic.

* * * * *